(12) United States Patent
Kang et al.

(10) Patent No.: US 12,077,102 B2
(45) Date of Patent: Sep. 3, 2024

(54) VEHICLE AND METHOD OF CONTROLLING THE SAME

(71) Applicants: Hyundai Motor Company, Seoul (KR); Kia Corporation, Seoul (KR)

(72) Inventors: Jooyean Kang, Gyeonggi-do (KR); Min Young Lee, Gyeonggi-do (KR); Taehee Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/124,372

(22) Filed: Mar. 21, 2023

(65) Prior Publication Data

US 2023/0219497 A1 Jul. 13, 2023

Related U.S. Application Data

(62) Division of application No. 17/037,956, filed on Sep. 30, 2020, now Pat. No. 11,634,070.

(30) Foreign Application Priority Data

Mar. 9, 2020 (KR) .......... 10-2020-0028803

(51) Int. Cl.
*B60Q 9/00* (2006.01)
*B60Q 3/20* (2017.01)
*B60Q 3/70* (2017.01)
*B60Q 3/80* (2017.01)
*B60Q 3/85* (2017.01)
*H04W 4/40* (2018.01)

(52) U.S. Cl.
CPC ............... *B60Q 9/00* (2013.01); *B60Q 3/20* (2017.02); *B60Q 3/70* (2017.02); *B60Q 3/80* (2017.02); *B60Q 3/85* (2017.02); *H04W 4/40* (2018.02); *B60Q 2500/00* (2013.01); *B60Q 2900/30* (2013.01); *B60Q 2900/40* (2022.05)

(58) Field of Classification Search
None
See application file for complete search history.

(56) References Cited

U.S. PATENT DOCUMENTS

2002/0071268 A1\* 6/2002 Pederson ............ B60Q 1/2611
362/35
2017/0332458 A1\* 11/2017 Salter .................... B60Q 1/503

\* cited by examiner

*Primary Examiner* — Ashok Patel
(74) *Attorney, Agent, or Firm* — Fox Rothschild LLP

(57) ABSTRACT

A vehicle is provided to analyze a signal received by a communicator and identify a first electronic device that transmits the received signal and a second electronic device that will transmit the received signal. The vehicle identifies a lighting algorithm that corresponds to an analysis result of the received signal and sequentially turns on a plurality of lighting devices based on the identified lighting algorithm.

5 Claims, 12 Drawing Sheets

VEHICLE AND METHOD OF CONTROLLING THE SAME

CROSS-REFERENCE TO RELATED APPLICATION(S)

This Application is a Divisional of application Ser. No. 17/037,956 filed on Sep. 30, 2020, which claims priority to Korean Application No. 10-2020-0028803, filed Mar. 9, 2020. The entire contents of these applications are incorporated herein by reference in their entirety.

TECHNICAL FIELD

The disclosure relates to a vehicle for controlling lighting and lights-out of a plurality of lighting devices, and a method of controlling the vehicle.

BACKGROUND

A vehicle includes a plurality of outdoor lighting devices for viewing the environment around the vehicle while gazing forward. The plurality of outdoor lighting devices are used to perform a lighting function and also a signal and communication function for other vehicles and pedestrians. The vehicle further includes an indoor lighting device for lighting the interior of the vehicle. Additionally, the vehicle includes a cluster that displays driving functions such as a vehicle speed, an engine speed, refueling amount, and cooling water and vehicle information. The cluster is further equipped with brake warning lights, seatbelt warning lights, anti-lock brake system (ABS) warning lights, traction control system (TCS) warning lights, and the indoor lighting device that displays an operating state and a warning state of other in-vehicle accessory systems.

The vehicle is provided with a center fascia and further includes operation buttons of various devices such as an audio, an air conditioner, and an emergency light. The operation buttons of the various devices are equipped with the lighting device for visual recognition of a user when driving at night or driving in a tunnel or parking lot. The various lighting devices provided in the vehicle are used as lighting and warning functions, and are turned on or off in response to external illumination, the operating state of the system, and user commands.

SUMMARY

An aspect of the disclosure is to provide a vehicle that visually displays a task processing process through sequential lighting of a plurality of lighting devices, and a method of controlling the vehicle. Another aspect of the disclosure is to provide a vehicle that visually displays whether data is transmitted or received through the lighting of the plurality of lighting devices, and a method of controlling the vehicle. Additional aspects of the disclosure will be set forth in part in the description which follows and, in part, will be obvious from the description, or may be learned by practice of the disclosure.

In accordance with an aspect of the disclosure, a vehicle may include a plurality of lighting devices; a communicator configured to communicate with an external electronic device and a plurality of internal electronic devices; and a controller configured to analyze a signal received by the communicator and identify information regarding a first electronic device that has transmitted the received signal, and to sequentially control the lighting of the plurality of lighting devices based on the identified information regarding the first electronic device. The first electronic device that transmits the signal may be either the external electronic device or the plurality of internal electronic devices.

The controller may be configured to analyze the signal received by the communicator, to identify a second electronic device to transmit the signal among the plurality of internal electronic devices, and to operate the communicator to transmit the received signal to the identified second electronic device. The second electronic device may be a device different from the first electronic device.

The vehicle may further include a storage configured to store identification information and position information of a reference lighting device among the plurality of lighting devices, to store identification information and position information of the remaining lighting devices, and to store identification information and position information of the plurality of internal electronic devices. When sequentially controlling the lighting of the plurality of lighting devices, the controller may be configured to identify the position information of the second electronic device, to identify the lighting devices disposed between the second electronic device and the reference lighting device based on the identified position information of the second electronic device and the position information of the reference lighting device, and to control the sequential lighting of the identified lighting devices.

The plurality of lighting devices may include a display apparatus. The external electronic device may include at least one of a server, an infrastructure, another vehicle, and a user terminal. The controller may be configured to adjust at least one of a lighting color, a lighting speed, a lighting brightness, and a lighting shape of the plurality of lighting devices based on an analysis result of the received signal. In particular, the controller may be configured to adjust a lighting speed of the plurality of lighting devices based on a signal processing speed of the received signal. The controller may be configured to control sequential lighting of the plurality of lighting devices based on the positions of two or more second electronic devices when there are the two or more second electronic devices that will transmit the received signal.

In accordance with another aspect of the disclosure, a vehicle may include a plurality of lighting devices provided inside a body; a plurality of electronic devices provided inside the body; a communicator configured to communicate with an external device; and a controller configured to sequentially control lighting of the plurality of lighting devices in response to whether a signal is transmitted during communication with the external device. The transmission of the signal may include transmission of the signal from the external device to at least one of the plurality of electronic devices, and transmission of the signal from any one of the plurality of electronic devices to the external device.

When transmitting the signal from the external device to the at least one of the plurality of electronic devices, the controller may be configured to control lighting of a reference lighting device among the plurality of electronic devices, and to sequentially control lighting from a lighting device adjacent to the reference lighting device. When transmitting the signal from any one of the plurality of electronic devices to the external device, the controller may be configured to control lighting of the lighting device at a position farthest from a reference lighting device among the plurality of electronic devices first, and to control lighting of the reference lighting device last. The external device may include at least one of a server, an infrastructure, another vehicle, and a user terminal.

The vehicle may further include a crash pad provided on an interior of the body and provided with a first lighting device among the plurality of lighting devices; a cluster provided with a second lighting device among the plurality of lighting devices; a steering wheel provided with a third lighting device among the plurality of lighting devices; and a backrest of a driver's seat provided with a fourth lighting device among the plurality of lighting devices.

The crash pad provided on the interior of the body may include a plurality of spaced apart lamps. The controller may be configured to operate the plurality of lamps to be lit sequentially the plurality of lamps are in a first direction in response to determining that the signal is transmitted from the external device to the at least one electronic device, and to operate the plurality of lamps to be sequentially turned on in a second direction in response to determining that the signal is transmitted from the electronic device to the external device.

The controller may be configured to control the lighting of the plurality of lighting devices so that a lighting shape formed by the plurality of lighting devices becomes a first shape when the signal received by the communicator is a signal corresponding to start-up, and to control the lighting of the plurality of lighting devices so that the lighting shape formed by the plurality of lighting devices becomes a second shape when the signal received by the communicator is a signal corresponding to the content.

In accordance with another aspect of the disclosure, a method of controlling a vehicle may include analyzing a signal received by a communicator to identify a first electronic device that transmits the received signal and a second electronic device that will transmit the received signal; transmitting the received signal to the second electronic device; identifying a lighting algorithm corresponding to an analysis result of the received signal; and sequentially lighting a plurality of lighting devices based on the identified lighting algorithm.

The method may further include displaying information corresponding to the received signal through the second electronic device; identifying a signal corresponding to information received by a user input; executing a transmission of the identified signal; and sequentially lighting the plurality of lighting devices in response to the transmission of the signal. The method may further include adjusting a lighting speed of the plurality of lighting devices based on a signal processing speed of the signal received by the communicator.

Additionally, the method may include sequentially lighting the plurality of lighting devices at a first speed when a start-on signal is received; and sequentially lighting the plurality of lighting devices at a second speed slower than the first speed when a start-off signal is received. The method may further include sequentially lighting the plurality of lighting devices when a start-on signal or a start-off signal is received, but turning on a next lighting device after the currently lit lighting device is turned off; and sequentially lighting the plurality of lighting devices when a content signal is received, but turning on the next lighting device before the currently lit lighting device is turned off.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
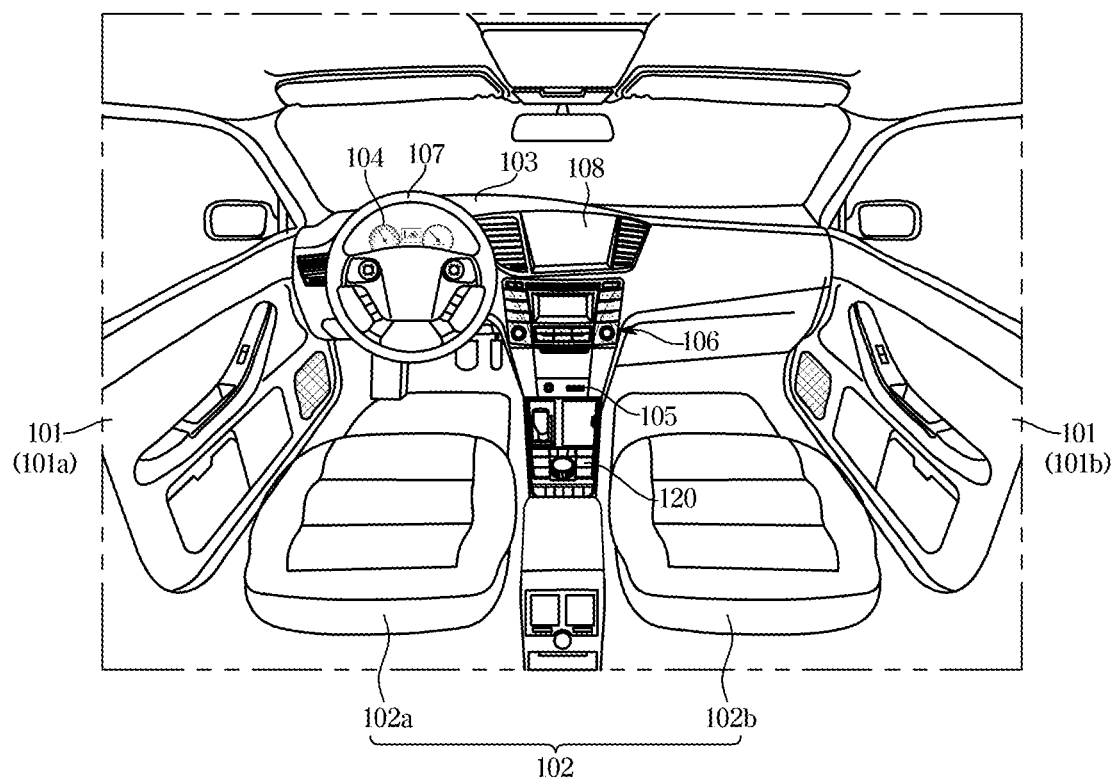
FIG. 1 is a view illustrating an interior of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of the exemplary embodiments of the disclosure will be described, and the description of what are commonly known in the art or what overlap each other in the embodiments will be omitted. The terms as used throughout the specification, such as "~part," "~module,"

"~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network. It will be further understood that the term "member" and its derivatives refer both to when a member is in contact with another member and when another member exists between the two members. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise. Reference numerals used for method steps are merely used for convenience of explanation, but not to limit an order of the steps. Thus, unless the context clearly dictates otherwise, the written order may be practiced otherwise.

Figure 2:
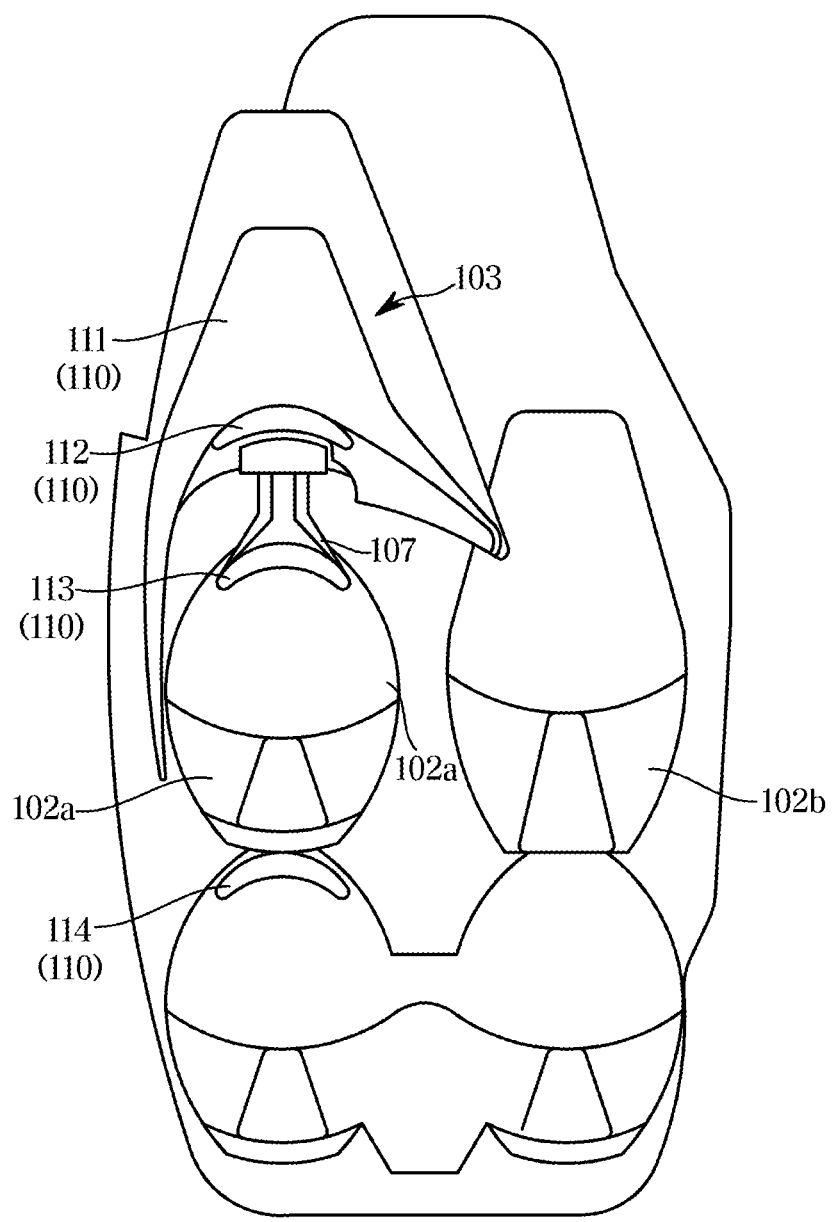
FIG. 2 is an exemplary view of a lighting device provided in a vehicle according to an exemplary embodiment.
Figure 3A:
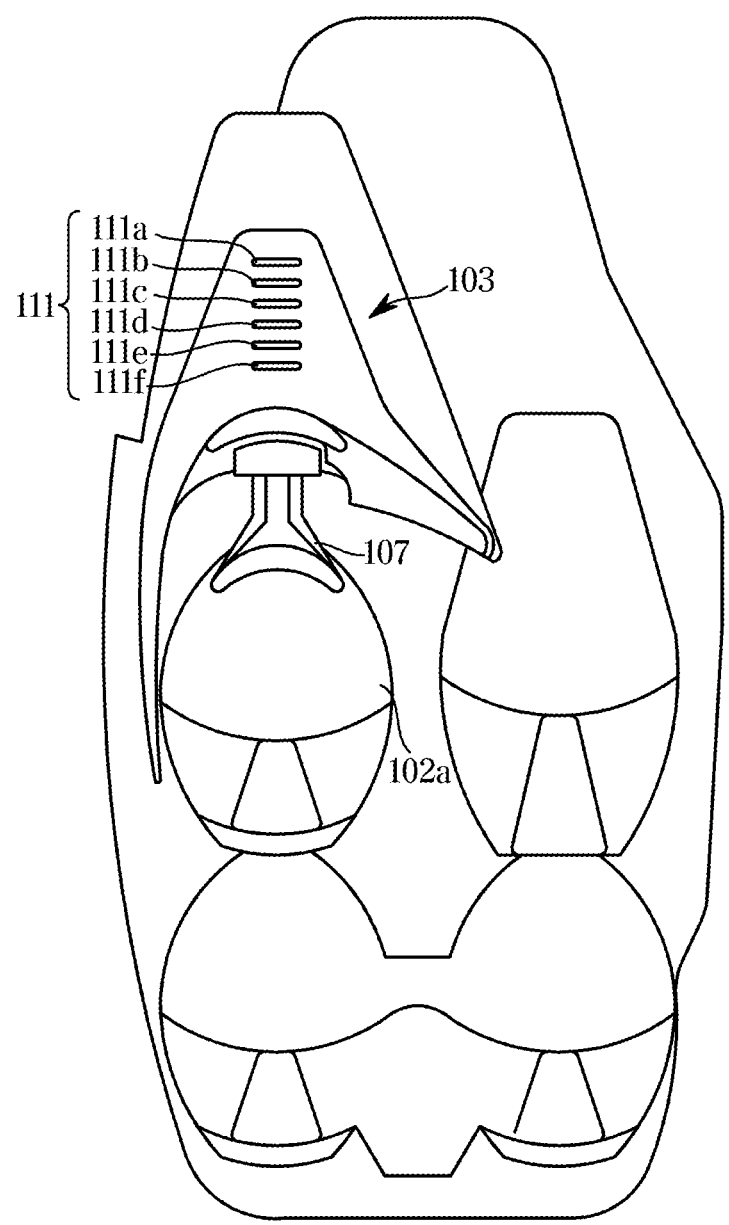
FIGS. 3A and 3B are exemplary views of a lighting device provided on a crash pad in a vehicle according to an exemplary embodiment.
Figure 3B:
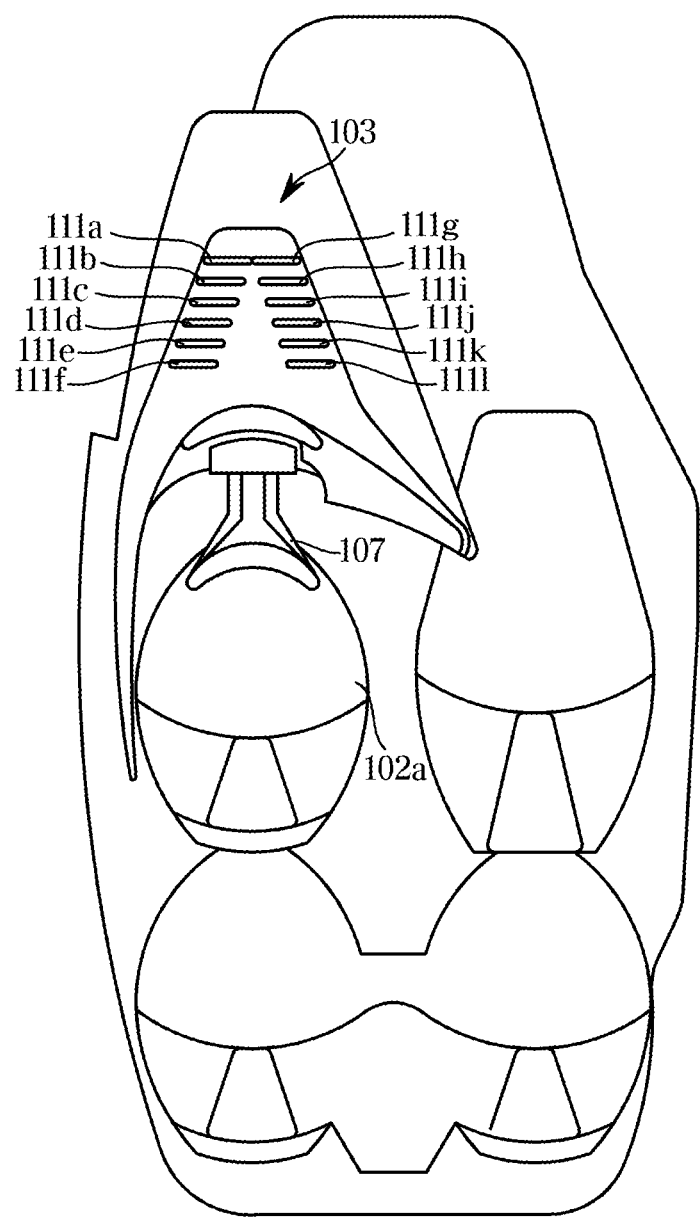

Hereinafter, an operation principle and exemplary embodiments of the disclosure will be described with reference to accompanying drawings. FIG. 1 is a view illustrating an interior of a vehicle according to an exemplary embodiment, FIG. 2 is an exemplary view of a lighting device provided in a vehicle according to an exemplary embodiment, and FIGS. 3A and 3B are exemplary views of a lighting device provided on a crash pad in a vehicle according to an exemplary embodiment.

A vehicle 1 may include a body with exterior and interior parts, and chassis on which mechanical devices required for driving are installed. The exterior part of the body may include a front bumper, a hood, a roof panel, a rear bumper, a trunk on which luggage is loaded, front, rear, left, and right doors 101 (101a and 101b), and window glasses provided to be opened and closed on the front, rear, left, and right doors 101 (101a and 101b).

The vehicle may include an external lighting device having a plurality of lamps that makes it easy to see all information of the vehicle 1 while looking in a driving direction. The external lighting device may perform not only a lighting function, but also a signal and communication function for other vehicles and pedestrians. The plurality of lamps forming the external lighting device may be arranged in pairs on the left and right sides of the front and rear of the vehicle 1.

As illustrated in FIG. 1, the interior part of the body may include a seat 102 (102a and 102b) on which a passenger sits, a crash pad 103 for alleviating an impact in case of collisions with an obstacle for the safety of a driver and an assistant driver, a cluster 104 (i.e., an instrument panel) disposed on the crash pad 103 and guiding driving functions such as a vehicle speed, an engine speed, refueling amount, and cooling water and vehicle information, a center fascia 105 provided with a control panel of an air conditioner, and a head unit 106 provided in the center fascia 105 and operating an audio device, the air conditioner, a Bluetooth device, and a heating element of the seat 102.

The seat 102 may be a chair in which the passenger may sit, and may include a driver's seat 102a in which the driver sits, and a passenger seat 102b provided next to the driver's seat and in which the passenger sits. The seat 102 may be provided at the rear of the driver's seat and the passenger seat, and may further include a rear seat in which the passenger and sit. The crash pad 103 may be provided with a space therein to prevent separation of various devices after assembly of the various devices. In addition, an airbag may be accommodated in a space inside the crash pad.

The vehicle 1 may be provided around the driver's seat 102a and the cluster 104 and may further include a steering wheel 107 that receives the driver's manipulation command for a driving direction, and a vehicle terminal 108 that is provided on the crash pad 103 and performs audio, video, and navigation functions. The vehicle terminal 108 may be implemented by the display apparatus or may be implemented by a touch screen. The cluster 104 may be provided in a size that corresponds to the driver's seat 102a or the steering wheel 107 inside the vehicle 1.

The vehicle 1 may further include a user interface that extends from the driver's seat 102a to the center fascia 105 and configured to receive user input and display an image. The user interface may be configured to perform the functions of the cluster 104 and the vehicle terminal 108, and also the functions of the head unit 106. The user interface may be implemented by the display apparatus such as liquid crystal display (LCD) or organic light emitting diode (OLED), or may be implemented by the touch screen.

When the cluster 104 is provided in the vehicle 1, the vehicle 1 may include a lighting device 110 provided on at least one of the crash pad 103, the cluster 104, the driver's seat 102a, a door 101, the steering wheel 107, and the vehicle terminal 108. In addition, the lighting device 110 provided in the crash pad 103 may be extended to the interior of the door 101. When the vehicle 1 is provided with the user interface, the vehicle 1 may include the lighting device 110 provided on at least one of the crash pad 103, the user interface, the driver's seat 102a, the door 101, and the steering wheel 107. In addition, the vehicle 1 may further include the lighting device 110 provided in a space between the driver's seat 102a and the rear seat.

As illustrated in FIG. 2, the lighting device 110 may include a first lighting device 111 provided on the crash pad 103, a second lighting device 112 provided on the cluster 104, a third lighting device 113 provided on the steering wheel 107, and a fourth lighting device 114 provided on a backrest of the driver's seat 102a. More particularly, the first lighting device 111 provided in the crash pad 103 may be provided on an edge of the crash pad 103, may be provided in a central region of the surface of the crash pad 103, and may be provided in an entire region of the crash pad 103. The first lighting device 111 provided on the crash pad 103 may include the plurality of lamps provided on the surface of the crash pad 103. The plurality of lamps may be disposed at regular intervals on the surface of the crash pad 103.

As illustrated in FIG. 3A, a plurality of lamps 111a, 111b, 111c, 111d, 111e, and 111f may be arranged at regular intervals on the surface of the crash pad 103. As illustrated in FIG. 3B, the plurality of lamps 111a, 111b, 111c, 111d, 111e, 111f, 111g, 111h, 111i, 111j, 111k, and 111l are respectively disposed on both sides of the surface of the crash pad 103, and may be disposed at regular intervals. The second lighting device 112 provided in the cluster 104 may be a lamp for displaying the image displayed through the cluster 104. For example, the lamp of the cluster 104 may be a backlight unit of the cluster 104.

The third lighting device 113 provided on the steering wheel 107 may be provided on the rim of the steering wheel 107 or may be provided on the central region of the steering wheel 107. The third lighting device 113 provided on the steering wheel 107 may be a lamp for the image display function of the display apparatus provided on the steering wheel 107. The fourth lighting device 114 provided on the backrest of the driver's seat 102a may be a lamp that performs a lighting function for the passenger in the rear seat, or may be provided in a terminal configured to perform the user interface function for the passenger in the rear seat.

In other words, the lamp provided in a passenger terminal is a lamp for an image display function of the passenger terminal, and may be, for example, the backlight unit. Accordingly, the lighting device 110 may be the lamp provided in the interior of the vehicle 1 for lighting or interior, or may be the backlight unit provided in the display apparatus but provided for image display.

The vehicle 1 may further include an inputter 120 provided on at least one of the center fascia 105, the head unit 106, and the steering wheel 107. The inputter 120 may be implemented as at least one of physical buttons, keys, switches, and levers. The inputter 120 may also be implemented as a jog dial or a touch pad for inputting a movement command and a selection command of a cursor displayed on a vehicle terminal AVN.

Figure 4:
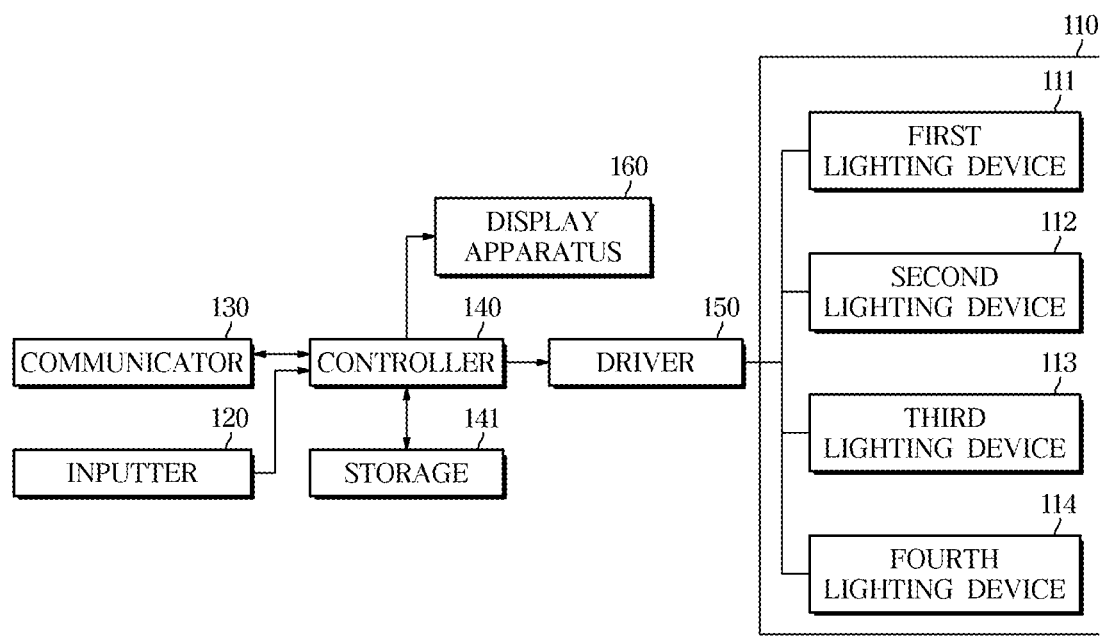
FIG. 4 is a control configuration diagram of a vehicle according to an exemplary embodiment.

FIG. 4 is a control configuration diagram of a vehicle according to an exemplary embodiment, which will be described with reference to FIGS. 5A, 5B, 6A, 6B, 6C, and 7. The vehicle 1 may include the plurality of lighting devices 110 (111, 112, 113, and 114), the inputter 120, a communicator 130, a controller 140, a storage 141, and a driver 150, and further include a display apparatus 160. The plurality of lighting devices 110 (111, 112, 113, and 114) may be provided inside the vehicle 1 but may be disposed at different positions to perform the lighting function.

Some of the plurality of lighting devices 110 may be disposed on the display apparatus 160. The lighting device 110 provided in the display apparatus 160 may be the lamp provided for displaying the image, or may be the lamp provided for visual design in the display apparatus 160. The inputter 120 may be configured to receive the user input. The inputter 120 may be configured to receive on/off commands of various functions that may be performed in the vehicle 1 as user inputs, and information about setting values for changing the operating state of the various functions. Additionally, the inputter 120 may be configured to receive an on/off command of an interactive lighting mode, receive an on/off command of an outdoor lighting device, or receive an on/off command of an indoor lighting device.

The interactive lighting mode may be a mode for controlling lighting of the plurality of lighting devices 110 provided in the vehicle 1 in response to transmission and reception of signals related to at least one function performed in the vehicle 1. The inputter 120 may be configured to receive an operation command related to a function corresponding to a transmitted signal or a received signal while performing the interactive lighting mode. For example, when a signal for a request for providing position information is received from another vehicle, the inputter 120 may be configured to receive "yes" or "no" as the operation command for an information providing function.

The communicator 130 may be configured to communicate with external devices. In particular, the external devices may include at least one of a server, an infrastructure, a user terminal, and other vehicles. The communicator 130 may be configured to perform communication between various devices provided inside the vehicle 1. The various devices provided inside the vehicle 1 may include the head unit 106, the inputter 120, the display apparatus 160, and the plurality of lighting devices 110 (111, 112, 113, and 114).

The communicator 130 may include one or more components that enable communication between external devices and internal components of the vehicle 1 and communication between internal components of the vehicle 1, for example, at least one of a short-range communication module, a wired communication module, and a wireless communication module. The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include one of the various wired communication modules, such as a controller area network (CAN) communication module, a local area network (LAN) module, a wide area network (WAN) module, or a value added network (VAN) module, and also one of various cable communication modules, such as a universal serial bus (USB), a high definition multimedia interface (HDMI), a digital visual interface (DVI), recommended standard (RS) 232, a power cable, or a plain old telephone service (POTS).

The wired communication module may further include a local interconnect network (LIN) module. The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, and the like.

The various lighting devices 110, the display apparatus 160, and the controller 140 provided in the vehicle 1 may be electrically and mechanically connected. The various lighting devices 110, the display apparatus 160, and the controller 140 provided in the vehicle 1 may be configured to transmit and receive various information via the communicator 130 provided in the vehicle 1. When a signal is received by the communicator 130, the controller 140 may be configured to analyze the received signal, determine an electronic device (hereinafter referred to as a first electronic device) that has transmitted the signal based on the analysis result, determine the electronic device (hereinafter referred to as a second electronic device) to transmit the received signal, and transmit the signal received from the first electronic device to the second electronic device.

When analyzing the received signal, the controller 140 may be configured to obtain information regarding a type of the signal, a function corresponding to the signal, and second electronic devices to transmit the signal. In particular, the first electronic device may be an external electronic device or at least one of a plurality of internal electronic devices. The second electronic device may be a different device from the first electronic device, and may be the external electronic device or at least one of the plurality of internal electronic devices.

For example, when the signal is received from the external electronic device, the controller 140 may be configured to analyze the received signal, determine the internal electronic device to transmit the received signal based on the analysis result, and transmit the received signal to the determined internal electronic device. The controller 140 may be configured to identify a lighting algorithm corresponding to the received signal among the lighting algorithms stored in the storage 141 based on the analysis result, and operate lighting of the plurality of lighting devices 110 based on the identified lighting algorithm.

For example, when the signal is received from the external electronic device, the controller 140 may be configured to control sequential lighting of the plurality of lighting devices 110 based on the lighting algorithm stored in the storage 141. In other words, the controller 140 may be configured to control sequential lighting of the plurality of lighting devices 110 in response to reception of signals from the external electronic device.

Figure 5A:
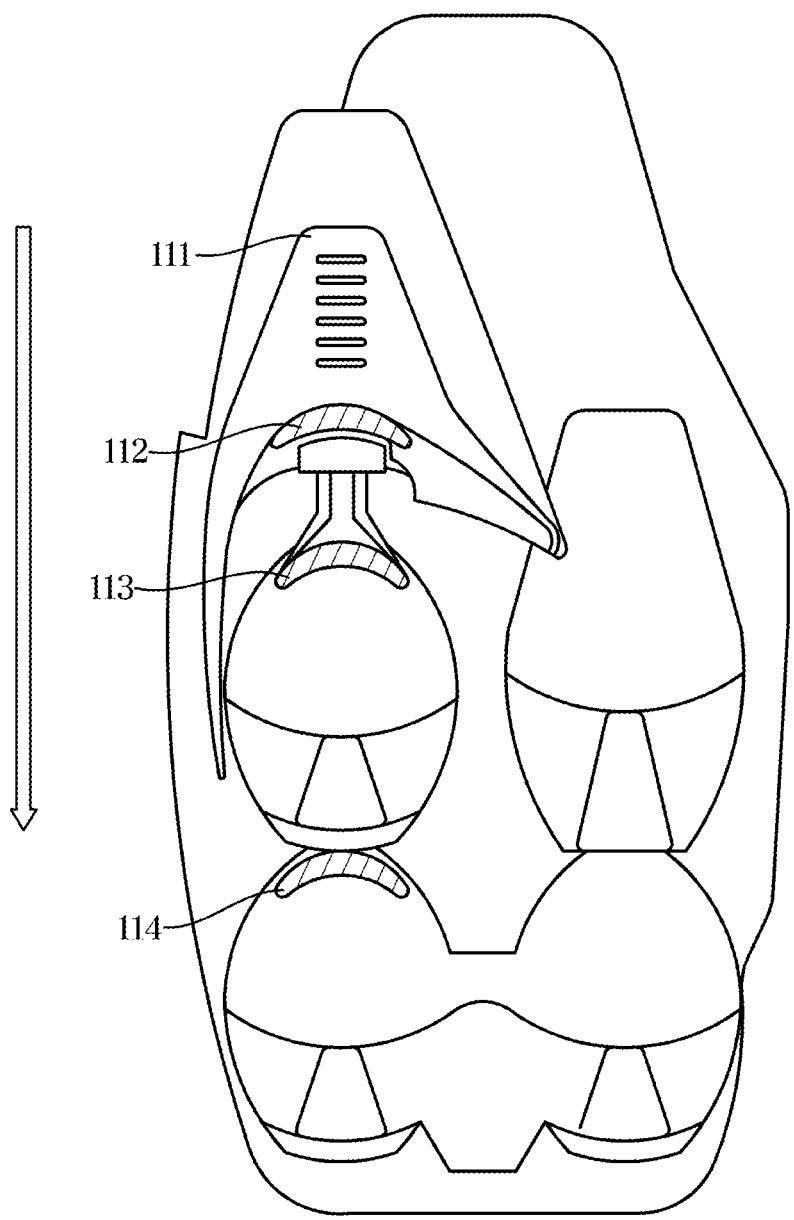
FIGS. 5A, 5B, 6A, 6B, 6C, and 7 are exemplary views of lighting of lighting devices provided in a vehicle according to an exemplary embodiment.

As illustrated in FIG. 5A, when the first lighting device 111 having the plurality of lamps provided on the crash pad 103, the second lighting device 112 provided on the cluster 104, the third lighting device 113 provided on the steering wheel 107, the fourth lighting device 114 provided on the backrest of the driver's seat 102*a* are provided in the vehicle 1, the controller 140 may be configured to operate the first lighting device 111, the second lighting device 112, the third lighting device 113, and the fourth lighting device 114 to be sequentially turned on when the signal is received from the external electronic device.

In particular, the second lighting device 112 provided in the cluster 104 may be the backlight unit provided in the cluster 104, and the third lighting device 113 provided in the steering wheel 107 may be the backlight unit of the display apparatus 160 provided in the steering wheel 107, and the fourth lighting device 114 provided in the backrest of the driver's seat 102*a* may be the passenger terminal provided on the backrest of the driver's seat 102*a* or the backlight unit of the display apparatus 160, and may be the lamp for the passenger.

As another example, when the signal is received from the internal electronic device, the controller 140 may be configured to control sequential lighting of the plurality of lighting devices 110 based on the lighting algorithm stored in the storage 141. In other words, when transmitting signals from the internal electronic device to the external electronic device, the controller 140 may be configured to control sequential lighting of the plurality of lighting devices in response to the transmission of the signals.

Figure 5B:
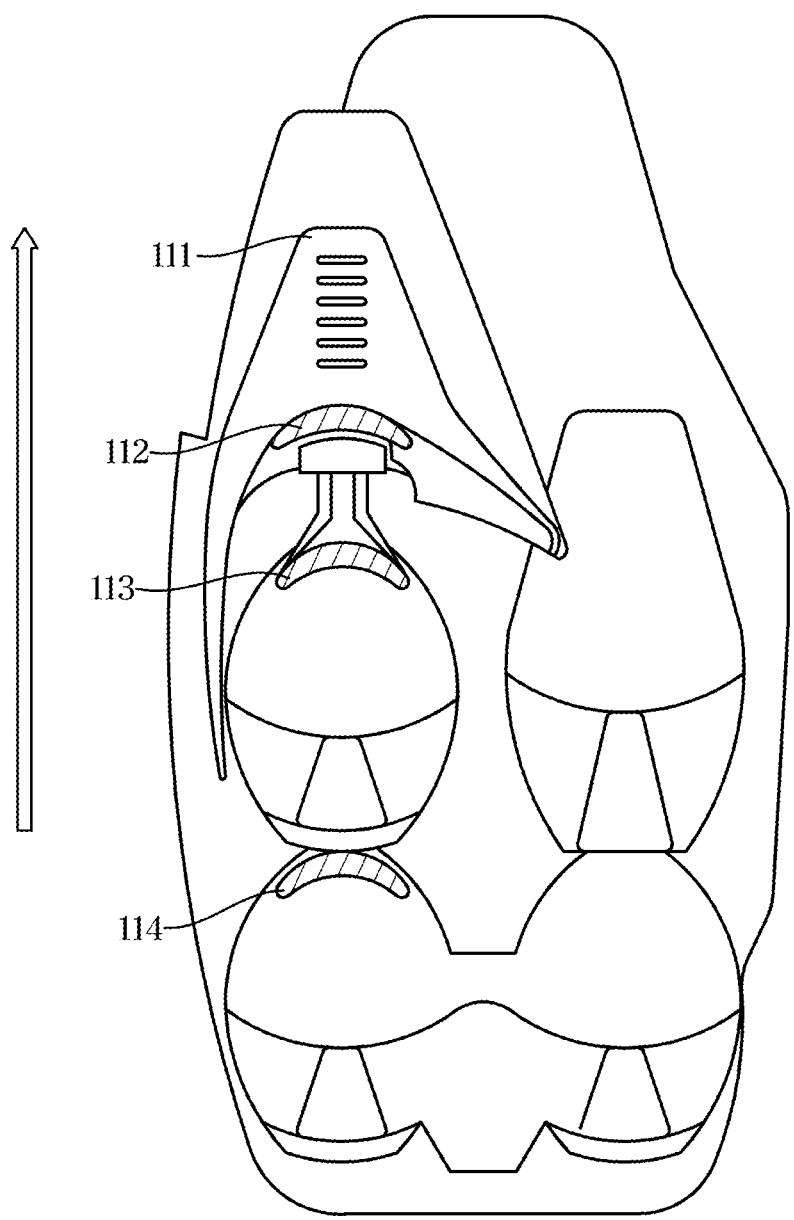

As illustrated in FIG. 5B, the controller 140 may be configured to operate the fourth lighting device 114, the third lighting device 113, the second lighting device 112, and the first lighting device 111 to be sequentially turned on. When controlling the sequential lighting of a plurality of lighting devices 110, the controller 140 may be configured to determine the lighting order of lighting devices 110 for lighting, and control the lighting of the lighting device 110 for a preset lighting maintenance time based on the determined lighting order, and control the lighting of a next lighting device when the preset lighting maintenance time has elapsed.

The controller 140 may be configured to identify the lighting devices 110 provided between the first electronic device and the second electronic device based on the position information of the plurality of electronic devices and lighting devices 110 stored in the storage 141, and control sequential lighting the identified lighting devices 110. At this time, the controller 140 may be configured to cause the lighting device 110 adjacent to the first electronic device to light first, and the lighting device 110 adjacent to the second electronic device to light last.

The lighting devices 110 provided between the first electronic device and the second electronic device may be lighting devices located on a straight line when the first electronic device and the second electronic device are connected in a straight line. The controller 140 may be configured to identify the lighting devices 110 provided between a reference lighting device and the second electronic device based on the position information of the plurality of electronic devices and lighting devices 110 stored in the storage 141, and control sequential lighting of the reference lighting device and the identified lighting device.

At this time, the controller 140 may be configured to cause the reference lighting device to light first, the lighting device provided at a position adjacent to the reference lighting device to light next, and the lighting device adjacent to the second electronic device to light last. The lighting devices provided between the reference lighting device and the second electronic device may be lighting devices located on the straight line when the reference lighting device and the second electronic device are connected in the straight line.

Figure 6A:
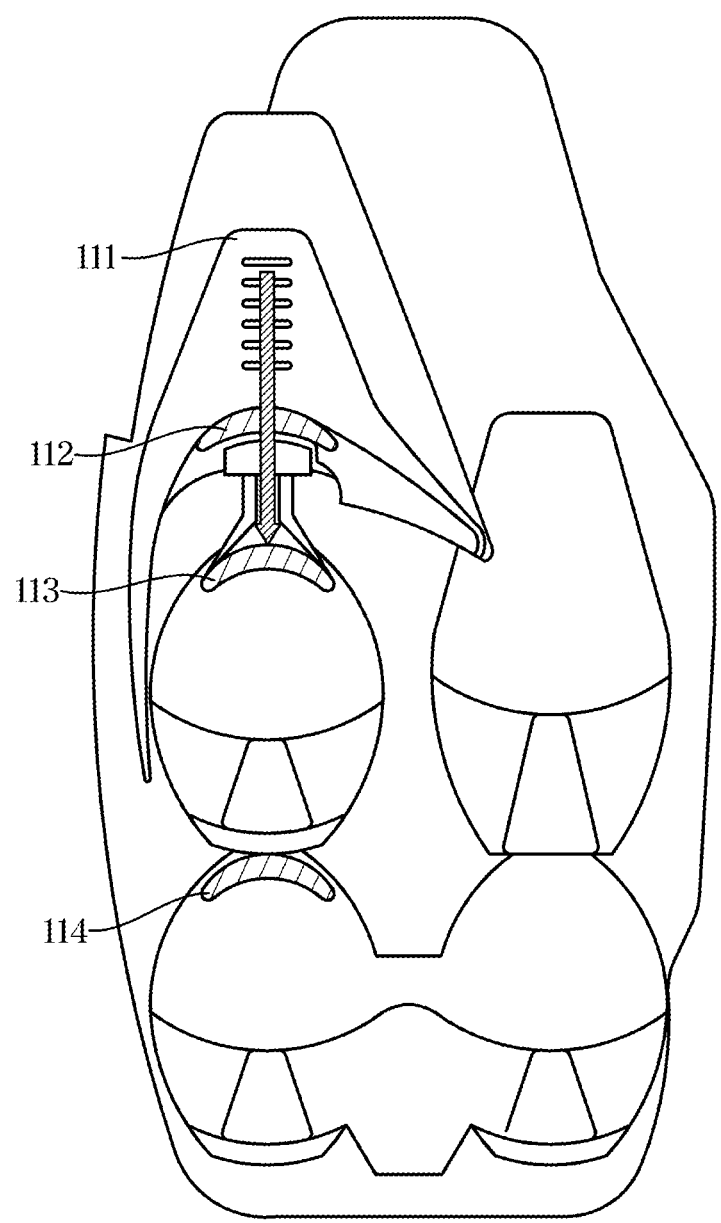

When the reference lighting device is the first lighting device provided on the crash pad 103 and the second electronic device is the display apparatus 160 provided on the steering wheel 107, as illustrated in FIG. 6A, the controller 140 may be configured to operate the first lighting device 111, the second lighting device 112, and the third lighting device 113 to be sequentially lit when the signal is received from the external electronic device, and operate the display apparatus 160 so that information corresponding to the signal received through the display apparatus 160 provided on the steering wheel 107.

Figure 6B:
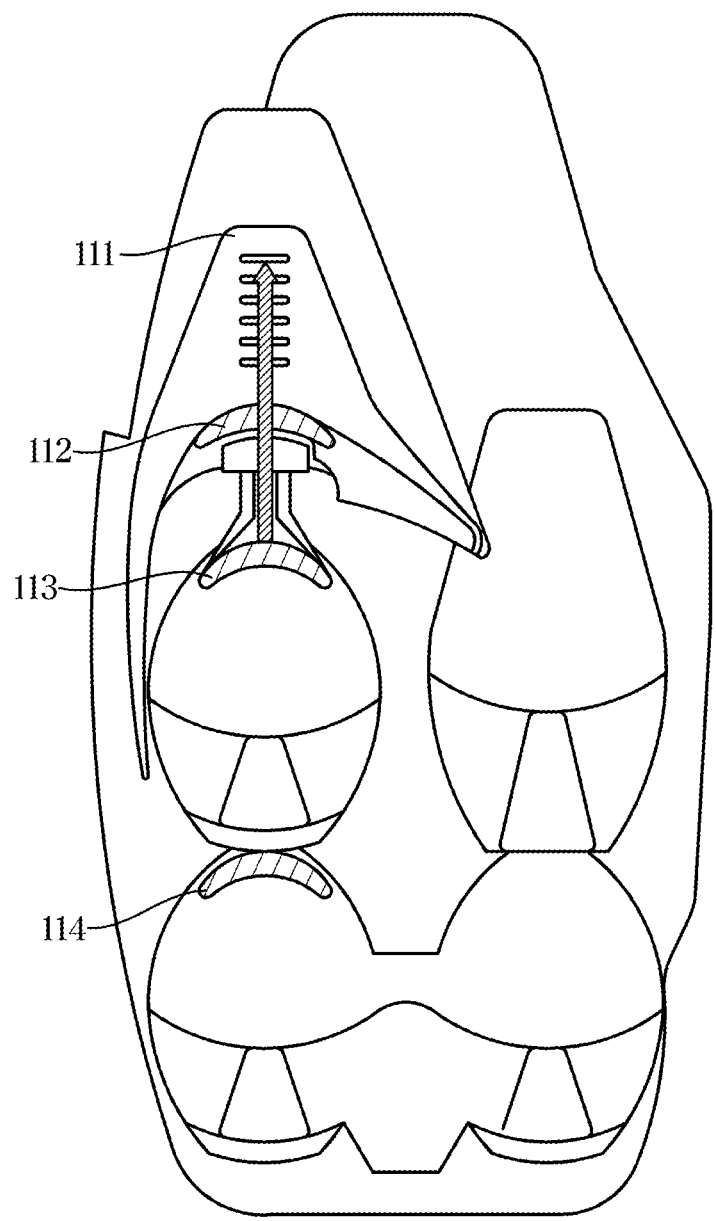

When the user input corresponding to the information displayed through the display apparatus 160 is received, the controller 140 may be configured to identify the second electronic device to transmit the signal corresponding to the received user input, and transmit the signal corresponding to the user input to the identified second electronic device. When the second electronic device is the external electronic device, as illustrated in FIG. 6B, the controller 140 may be configured to sequentially turn on the third lighting device 113, the second lighting device 112, and the first lighting device 111, and transmit the signal corresponding to the user input is transmitted to the external electronic device.

Figure 6C:
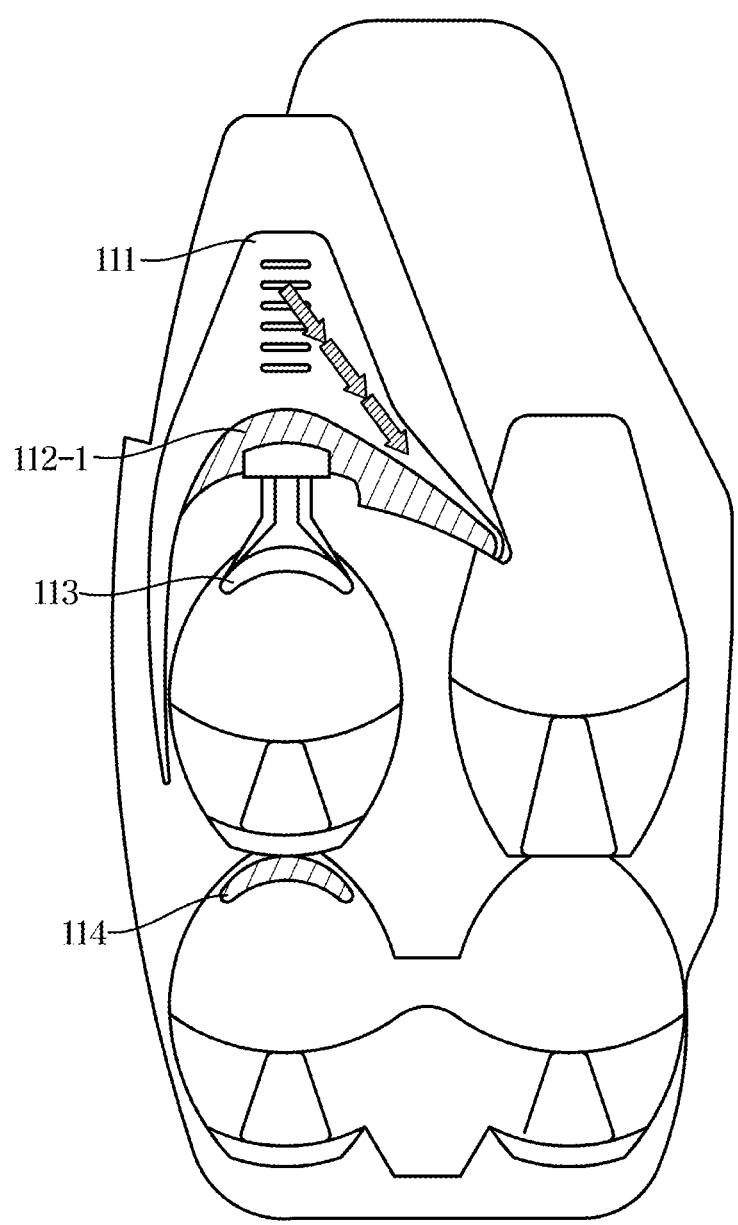

When the reference lighting device is the first lighting device provided on the crash pad 103, and the second electronic device is the user interface, as illustrated in FIG. 6C, when the signal is received from the external electronic device, the controller 140 may be configured to sequentially turn on the first lighting device 111 and the second lighting device 112-1, and operate the user interface to display information corresponding to the signal received through the user interface. In particular, the second lighting device 112-1 may be the lamp provided in the user interface or the backlight unit provided in the user interface.

The controller 140 may be configured to identify the lighting algorithm corresponding to the type of signal among the lighting algorithms stored in the storage 141 and control the sequential lighting of the plurality of lighting devices 110 based on the identified lighting algorithm. For example, in response to determining that the received signal is a signal for content playback based on the analysis result, the controller 140 may be configured to identify the electronic device to play the content, transmit the received signal to the identified electronic device, identify the lighting algorithm corresponding to content playback, and control sequential lighting of the plurality of lighting devices 110 based on the identified lighting algorithm. In response to determining that there are two second electronic devices to be transmitted the received signal based on the analysis result, the controller 140 may be configured to identify the lighting devices provided between each of the second electronic devices and the reference lighting device, and control sequential lighting of the identified lighting devices.

Figure 7:
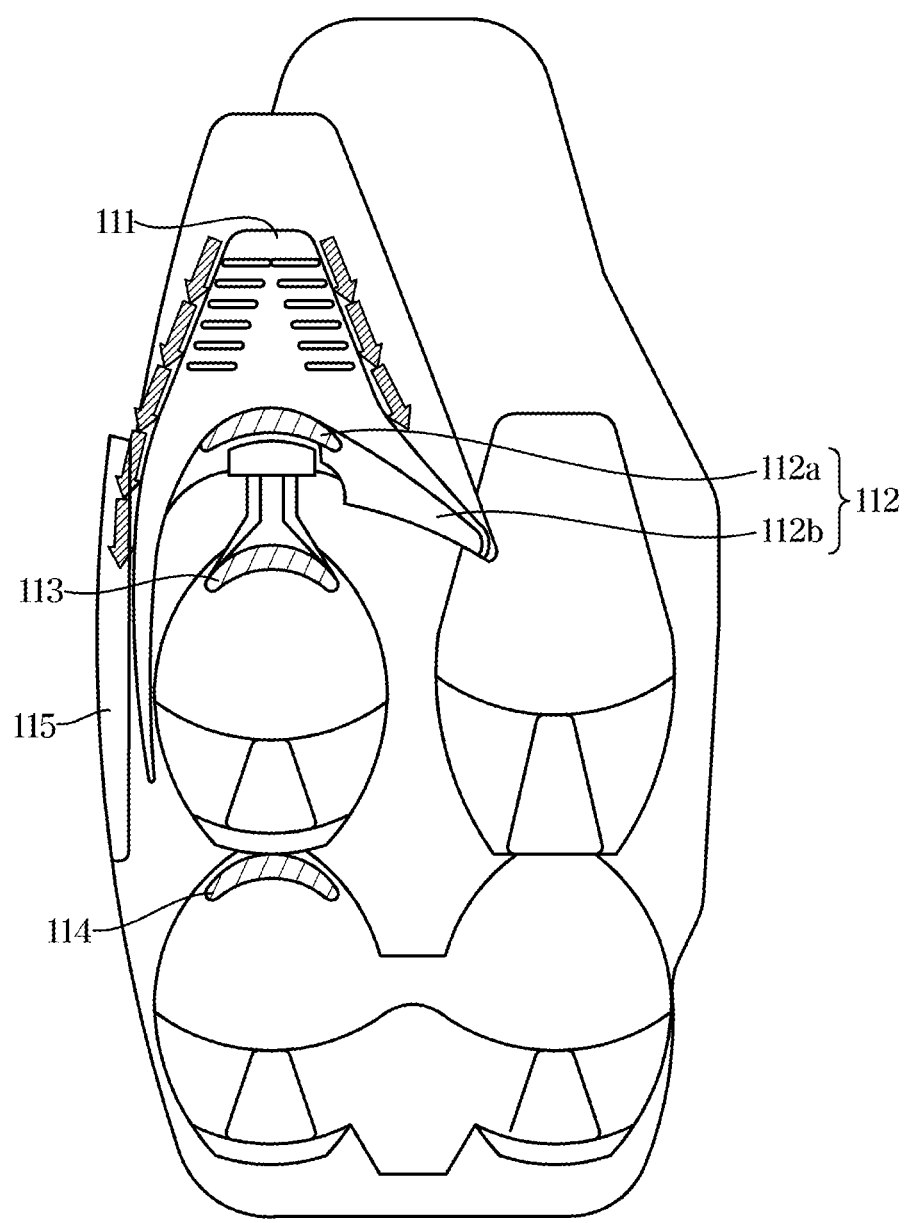

As illustrated in FIG. 7, when the signal received from the external electronic device needs to be transmitted to the passenger terminal (e.g., one second electronic device) and the vehicle terminal 108 (e.g., another second electronic device) provided on the backrest of the driver's seat 102*a*, the controller 140 may be configured to identify the lighting device provided between the reference lighting device and the passenger terminal, control the sequential lighting of the identified lighting devices, identify the lighting device provided between the reference lighting device and the vehicle terminal 108, and control the sequential lighting of the identified lighting devices.

In other words, the controller 140 may be configured to control the sequential lighting of the first lighting device 111 as the reference lighting device, a fifth lighting device 115 and the fourth lighting device 114 provided in the door, and control the sequential lighting of the first lighting device 111 and a sixth lighting device 112*b*. The controller 140 may be configured to simultaneously perform the sequential lighting of the first lighting device 111, the fifth lighting device 115, and the fourth lighting device 114, and the sequential lighting of the first lighting device 111 and the sixth lighting device 112*b* at the same time. Additionally, the controller 140 may be configured to perform sequential lighting of the first lighting device 111, the fifth lighting device 115, and the fourth lighting device 114, and then sequential lighting of the first lighting device 111 and the sixth lighting device 112*b*.

The sixth lighting device 112*b* may be the backlight unit provided in the vehicle terminal 108. The sixth lighting device 112*b* may be provided integrally with the second lighting device 112*a* provided in the cluster 104. When identifying the lighting devices 110 for lighting, the controller 140 may also be configured to identify the display apparatus 160 having the backlight unit as the lighting device, and also control the lighting of the backlight unit of the identified display apparatus 160 when executing the sequential lighting of the lighting devices 110.

The disclosure may improve the utilization of various devices by controlling the lighting and lights-out of the lighting device 110 provided in the display apparatus 160 as well as the lighting device 110 provided in the vehicle 1 in response to data transmission and reception. The controller 140 may be configured to control the sequential lighting of the plurality of lighting devices 110 based on the lighting algorithm stored in the storage 141 in response to determining that there are at least two second electronic devices to transmit signals based on the analysis result.

The controller 140 may be configured to control sequential lighting of the plurality of lighting devices 110 in response to the capacity of the received signal, but may control a lighting speed. For example, when the capacity of the received signal is greater than or equal to a reference capacity, the controller 140 may be configured to sequentially turn on the plurality of lighting devices 110 at a first speed. When the capacity of the received signal is less than the reference capacity, the controller 140 may be configured to sequentially turn on the plurality of lighting devices 110 at a second speed.

The controller 140 may be configured to control the sequential lighting of the plurality of lighting devices 110 in response to the speed of signal processing of the received signal, and adjust the lighting speed of the plurality of lighting devices 110. For example, when a signal processing speed is greater than or equal to a reference speed, the controller 140 may be configured to sequentially turn on the plurality of lighting devices 110 at the first speed. When the signal processing speed is less than the reference speed, the controller 140 may be configured to sequentially turn on the plurality of lighting devices 110 at a second speed.

The user's perception of task processing may be improved and interactive lighting may be implemented by displaying the process of the task performed in the vehicle 1 through the lighting and lights-out of the lighting device 110. The controller 140 may be configured to control lighting with colors corresponding to transmission of signals and reception of signals, respectively, and control lighting with shapes corresponding to transmission of signals and reception of signals, respectively. The shape may include a dot shape, a linear shape, and the like.

For example, the controller 140 may be configured to sequentially turn on the plurality of lighting devices 110 in a red-based color when transmitting the signal, and when the signal is received, the plurality of lighting devices 110 may be operated sequentially in a blue-based color. The controller 140 may be configured to operate the plurality of lighting devices 110 to be sequentially lit in the dot shape when the signal is transmitted, and operate the plurality of lighting devices 110 to be sequentially lit in the linear shape when the signal is received.

The controller 140 may be configured to identify the lighting shape corresponding to the type of the received signal and control sequential lighting of the plurality of lighting devices 110 based on the identified lighting shape. In other words, the controller 140 may be configured to differently control the shape corresponding to sequential lighting of the plurality of lighting devices 110 in response to receiving a start signal and the lighting shape corresponding to sequential lighting of the plurality of lighting devices 110 in response to receiving a data signal. For example, when a start-on-off signal is received, the controller 140 may be configured to control the lighting of the next lighting device after the lighting device that is currently lit is turned off so that the lighting shape between the lighting devices becomes the dot shape. In response to receiving the data signal, the controller 140 may be configured to control the lighting of the next lighting device before the lighting device that is currently lit is turned off so that the lighting shape between the lighting devices becomes the linear shape.

The controller 140 may be configured to control the sequential lighting of the plurality of lighting devices 110 at a speed corresponding to the start-on signal and the start-off signal, respectively. For example, the sequential lighting speed of the plurality of lighting devices 110 may be adjusted to the first speed when the start-on signal is received through a remote controller or a start button, and the sequential lighting speed of the plurality of lighting devices 110 may be adjusted to the second speed when the start-on signal is received through the remote controller or the start button. In particular, the first speed may be faster than the second speed.

The controller 140 may also be configured to control the sequential lighting of a plurality of lamps 111*a* to 111*f* or 111a to 111l provided in the first lighting device 111 based on the analysis result. The controller 140 may be configured to control at least one of a sequential lighting direction, lighting brightness, and lighting speed of the plurality of lamps 111a to 111f or 111a to 111l provided in the first lighting device 111 based on the analysis result. The controller 140 may be configured to operate the plurality of lighting devices 110 to blink at regular time intervals based on the analysis result, or adjust the lighting color of the plurality of lighting devices 110 to be changed. The controller 140 may be configured to control sequential lighting of the plurality of lighting devices 110 in response to a driving mode or a vehicle state.

The driving mode may include an autonomous driving mode, a cruise mode, a manual mode, and a crowded driving mode, and the vehicle state may include an inspection state, a failure state, a normal state, a collision caution state, and a safety state. The controller 140 may be provided on the head unit 106, may be provided on the steering wheel 107, may be provided inside the crash pad 103, or may be provided on the first lighting device 111.

At least one component may be added or deleted corresponding to the performance of the components of the controller 140 illustrated in FIG. 4. It will be readily understood by those skilled in the art that the mutual position of the components may be changed corresponding to the performance or structure of the vehicle 1. The controller 140 may also be implemented with one processor.

The controller 140 may be implemented with a memory storing an algorithm to control operation of the components in the vehicle 1 or data about a program that implements the algorithm, and a processor carrying out the aforementioned operation using the data stored in the memory. The memory and the processor may be implemented in separate chips. Alternatively, the memory and the processor may be implemented in a single chip. The storage 141 may store identification information and position information of the plurality of lighting devices 110 (111, 112, 113, and 114). In particular, the position information of the plurality of lighting devices 110 (111, 112, 113, and 114) may include distance information and direction information.

The distance information may be distance information to the first lighting device 111 based on the position of the first lighting device 111. The direction information may be front, rear, left, and right direction information based on the first lighting device 111. The distance information may be distance information to the steering wheel 107 based on the position of the steering wheel 107. The direction information may be front, rear, left, and right direction information based on the steering wheel 107.

The storage 141 may be configured to store the lighting algorithm corresponding to an initial transmission position of the signal, and may also store the lighting algorithm corresponding to a final reception position of the signal. Additionally, the storage 141 may be configured to store the lighting algorithm corresponding to the initial transmission position and the final reception position of the signal. The storage 141 may also be configured to store the lighting algorithm corresponding to a signal type or a signal kind.

The storage 141 may also be configured to store identification information of the electronic device corresponding to the signal type or signal kind. In particular, the electronic device may be a device that performs the operation or function based on the received signal. For example, the electronic device may be the head unit 106, the vehicle terminal 108, or any one of the display apparatuses 160 provided in the vehicle 1. The storage 141 may be configured to store the position information of the plurality of electronic devices provided in the vehicle 1.

The position information of the plurality of electronic devices may include distance information to and from the first lighting device 111 based on the position of the first lighting device 111, and may further include front, rear, left, and right direction information based on the first lighting device 111. The lighting algorithm may include information on the lighting device to perform lighting first and the lighting device to finally perform lighting. The lighting algorithm may include information regarding the lighting order and lighting maintenance time of the plurality of lighting devices 110.

The lighting algorithm may include information regarding lighting intervals between the plurality of lighting devices 110. In particular, the lighting interval may be a difference in lighting start time between lighting devices in which the lighting order is adjacent, or may be a time between the lighting time of the previous lighting device and the lighting time of the current lighting device. The lighting algorithm may include information regarding the lighting speed between the plurality of lighting devices 110, and may also include information regarding the lighting color of the plurality of lighting devices 110. In addition, when the plurality of lamps are provided in one lighting device, the storage 141 may be configured to store the position information of the plurality of lamps, and also store the lighting order of the plurality of lamps based on the lighting algorithm.

The storage 141 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto. The storage 141 may be a memory implemented with a chip separate from the aforementioned processor in relation to the controller 140, or may be implemented integrally with the processor in a single chip.

The driver 150 may turn the plurality of lighting devices 110 on or off in response to a control command of the controller 140. The driver 150 may allow a current to be applied to the plurality of lighting devices 110 or a voltage may be applied. The driver 150 may adjust a magnitude of current or voltage applied to the plurality of lighting devices 110. The display apparatus 160 may be configured to display information corresponding to a function performed in the vehicle 1 as the image. The display apparatus 160 may be at least one of the cluster 104, the user interface, and the vehicle terminal 108.

When the plurality of display apparatuses 160 are provided in the vehicle 1, the plurality of display apparatuses 160 may be configured to display different images. When the plurality of display apparatuses 160 are provided in the vehicle 1, some of the plurality of display apparatuses 160 may be configured to display the same image, and the other display apparatus 160 may be configured to display different images.

Figure 8:
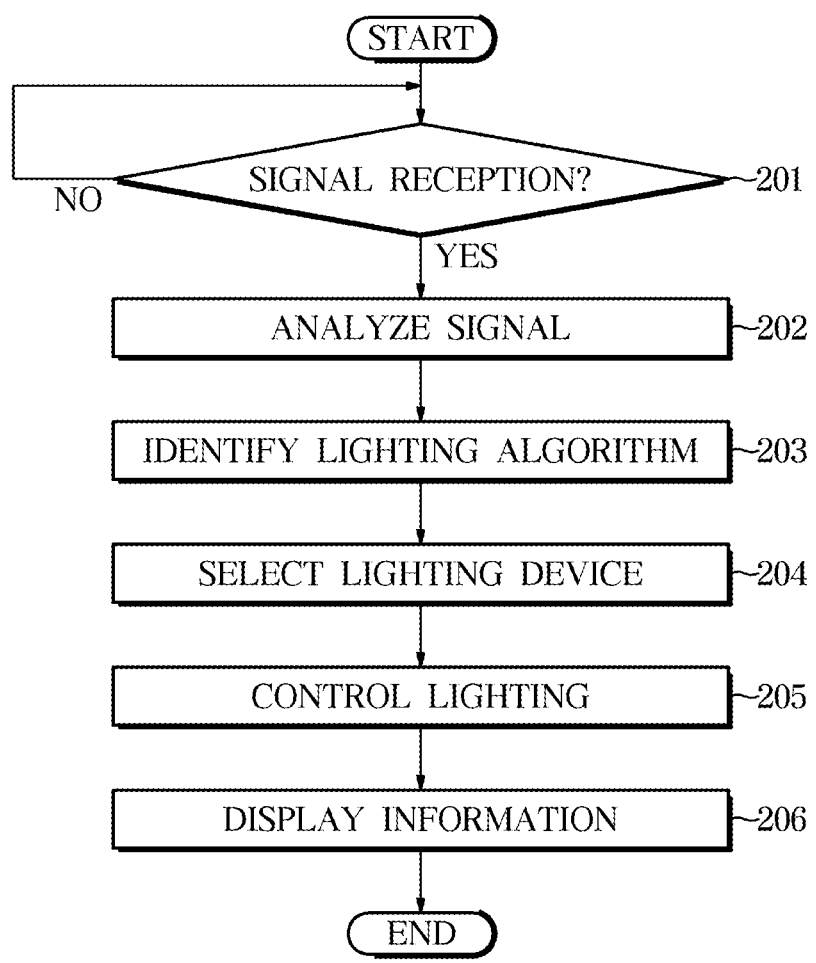
FIG. 8 is a control flowchart of a vehicle according to an exemplary embodiment.

FIG. 8 is a control flowchart of a vehicle according to an exemplary embodiment. The method described herein below may be executed by a controller within the vehicle. When the communicator 130 receives the signal (201), the vehicle 1 may be configured to analyze the received signal (202) and determine the electronic device (hereinafter referred to as the first electronic device) that has transmitted the signal based on the analysis result, and determine the electronic device (hereinafter referred to as the second electronic device) to transmit the signal.

When analyzing the received signal, the vehicle 1 may be configured to obtain information about the signal type, the function corresponding to the signal, and second electronic devices to transmit the signal. In particular, the first electronic device may be the external electronic device or at least one of the plurality of internal electronic devices. The second electronic device is a different device from the first electronic device, and may be the external electronic device or at least one of the plurality of internal electronic devices.

The external electronic device may include at least one of a server, an infrastructure, the user interface provided in another vehicle, a terminal provided in another vehicle, and the user terminal. The vehicle 1 may be configured to identify the lighting algorithm corresponding to the received signal among the lighting algorithms stored in the storage 141 based on the analysis result (203), and control lighting of the plurality of lighting devices 110 based on the identified lighting algorithm. In other words, the vehicle 1 may be configured to select the lighting devices to control lighting based on the lighting algorithm (204), and control the lighting of the selected plurality of lighting devices 110 (205).

When operating lighting based on the lighting algorithm, the vehicle 1 may be configured to adjust lighting start time, lighting end time, and lighting maintenance time of the plurality of lighting devices 110, and also adjust the color and brightness of the plurality of lighting devices 110. By adjusting the lighting start time, lighting end time, and lighting maintenance time of the plurality of lighting devices 110, the vehicle 1 may be configured to adjust the lighting speed between the plurality of lighting devices 110 and adjust the lighting shape by the plurality of lighting devices 110.

For example, when the start-on signal or the start-off signal is received, the vehicle 1 may be configured to control the lighting of the next lighting device after the lighting device in the current lighting state is turned off so that the lighting shape formed between the lighting devices becomes the dot shape. When the data signal such as a content signal is received, the vehicle 1 may be configured to control the lighting of the next lighting device before the lighting device in the current lighting state is turned off so that the lighting shape formed by the lighting devices becomes the linear shape.

When the start-on signal is received, the vehicle 1 may be configured to control the sequential lighting of the plurality of lighting devices 110 and adjust the brightness to gradually increase. When the start-off signal is received, the vehicle 1 may be configured to control the sequential lighting of the plurality of lighting devices 110 and adjust the brightness to gradually decrease. When performing a welcome mode in response to the reception of the start-on signal, the vehicle 1 may be configured to control sequential lighting of the plurality of lighting devices, and control to light at the first speed. When performing a good-by mode in response to the reception of the start-off signal, the vehicle 1 may be configured to control sequential lighting of the plurality of lighting devices, and control to light at a second speed slower than the first speed.

Then, the vehicle 1 may be configured to transmit the signal received from the first electronic device to the second electronic device so that information corresponding to the received signal is displayed through the second electronic device (206). For example, when the reference lighting device is the first lighting device 111 provided on the crash pad 103, and the second electronic device is the display apparatus 160 provided on the steering wheel 107, the vehicle 1 may be configured to operate the first lighting device 111, the second lighting device 112, the third lighting device 113, and the fourth lighting device 114 to be sequentially lit, and display information corresponding to be sequentially turned on when the signal is received from the external electronic device.

When the user input corresponding to the information displayed through the display apparatus 160 is received, the next vehicle may be configured to identify the second electronic device to transmit the signal corresponding to the received user input, identify the lighting algorithm corresponding to the received signal, control the lighting of the plurality of lighting devices based on the identified lighting algorithm, and transmit the signal corresponding to the user input to the identified second electronic device. When the second electronic device is the external electronic device, the vehicle 1 may be configured to operate the fourth lighting device 114, the third lighting device 113, the second lighting device 112, and the first lighting device 111 to be sequentially lit, and transmit the signal corresponding to the user input to the external electronic device.

According to the exemplary embodiments of the disclosure, the disclosure may improve the user's perception of task processing and implement interactive lighting by displaying the task processing process performed in the vehicle through lighting and lights-out of the lighting device. The disclosure may increase the utilization of various devices by controlling the lighting and lights-out of the lighting device provided in the vehicle as well as the lighting device provided in the display apparatus in response to data transmission and reception. In other words, the disclosure may provide a new signal system in the vehicle by performing interworking between the lighting device provided in the display apparatus and the lighting device provided in the vehicle.

The disclosure may be based on the derivation of specialized items in consideration of the service era in which AI-based autonomous driving and connectivity mobility are strengthened. As described above, the disclosure may improve the quality and marketability of the vehicle, further increase the user's satisfaction, improve the user's convenience and vehicle safety, and secure the vehicle's competitiveness.

The disclosed exemplary embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, etc.

Exemplary embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above exemplary embodiments are only by way of example, and should not be interpreted in a limited sense.

What is claimed is:

1. A method of controlling a vehicle including a plurality of lighting devices, comprising:
performing, by a communicator communication with an external electronic device and a plurality of internal electric devices;
analyzing, by a controller, a signal received by the communicator;
identifying, by the controller information regarding a first electronic device that transmitted the signal based on an analysis result of the signal;
identifying, by the controller, a second electronic device for transmitting the signal among the plurality of internal electronic devices based on the signal received by the communicator;
transmitting, by the controller, the signal to the second electronic device;
identifying, by the controller, a lighting algorithm corresponding to an analysis result of the signal based on information stored in a storage; and
sequentially lighting, by the controller, the plurality of lighting devices based on the identified lighting algorithm;
wherein the information stored in the storage includes identification information and position information of the plurality of lighting devices;
wherein the position information of the plurality of lighting devices includes distance information between the plurality of lighting devices and direction information between the plurality of lighting devices;
wherein sequentially lighting the plurality of lighting devices includes:
sequentially controlling the lighting of the plurality of lighting devices in a first direction based on the position information of the plurality of lighting devices stored in the storage when the first electronic device is the external electronic device, and
sequentially controlling the lighting of the plurality of lighting devices in a second direction based on the position information of the plurality of lighting devices stored in the storage when the first electronic device is one of the plurality of internal electronic devices; and
wherein the first direction and the second direction are different from each other.

2. The method according to claim 1, further comprising:
identifying, by the controller, a signal corresponding to information received by a user input;
identifying, by the controller, the second electronic device based on the user input;
transmitting, by the communicator, the identified signal to the second electronic device; and
sequentially lighting, by the controller, the plurality of lighting devices in response to the transmission of the signal corresponding to information received by the user input.

3. The method according to claim 1, further comprising:
adjusting, by the controller, a lighting speed of the plurality of lighting devices based on a signal processing speed of the signal received by the communicator.

4. The method according to claim 1, further comprising:
sequentially lighting, by the controller, the plurality of lighting devices at a first speed when a start-on signal is received by a start button; and
sequentially lighting, by the controller, the plurality of lighting devices at a second speed slower than the first speed when a start-off signal is received by the start button.

5. The method according to claim 1, further comprising:
sequentially lighting, by the controller, the plurality of lighting devices when a start-on signal or a start-off signal is received by a start button, and turning on a next lighting device after the currently lit lighting device is turned off; and
sequentially lighting, by the controller, the plurality of lighting devices when a content signal is received by the communicator, and turning on the next lighting device before the currently lit lighting device is turned off.

* * * * *